(12) United States Patent
Anquetil et al.

(10) Patent No.: US 10,331,307 B2
(45) Date of Patent: Jun. 25, 2019

(54) METHOD FOR SELECTING INTERACTIVITY MODE

(71) Applicant: Institut National de Sciences Appliquees, Rennes (FR)

(72) Inventors: Eric Anquetil, Melesse (FR); Abdullah Almaksour, Rennes (FR); Gregoire Richard, Rennes (FR)

(73) Assignee: INSTITUT NATIONAL DE SCIENCES APPLIQUEES, Rennes (FR)

( * ) Notice: Subject to any disclaimer, the term of this patent is extended or adjusted under 35 U.S.C. 154(b) by 74 days.

(21) Appl. No.: 14/429,649

(22) PCT Filed: Sep. 19, 2013

(86) PCT No.: PCT/EP2013/069439
§ 371 (c)(1),
(2) Date: Mar. 19, 2015

(87) PCT Pub. No.: WO2014/044740
PCT Pub. Date: Mar. 27, 2014

(65) Prior Publication Data
US 2015/0227275 A1  Aug. 13, 2015

(30) Foreign Application Priority Data
Sep. 19, 2012 (FR) .................................. 12 58803

(51) Int. Cl.
*G06F 3/048* (2013.01)
*G06F 3/0484* (2013.01)
(Continued)

(52) U.S. Cl.
CPC ............ *G06F 3/0484* (2013.01); *G06F 3/017* (2013.01); *G06F 3/0325* (2013.01);
(Continued)

(58) Field of Classification Search
CPC .................................................... G06F 3/0484
See application file for complete search history.

(56) References Cited

U.S. PATENT DOCUMENTS

| | | | | |
|---|---|---|---|---|
| 5,252,951 A | * | 10/1993 | Tannenbaum | .......... G06F 3/023 345/156 |
| 5,397,865 A | * | 3/1995 | Park | ........................ G06F 3/016 178/18.05 |

(Continued)

FOREIGN PATENT DOCUMENTS

| | | |
|---|---|---|
| EP | 2040156 A2 | 7/2008 |
| EP | 2426584 A1 | 7/2011 |

OTHER PUBLICATIONS

Baig, "iPad for Dummies, 4th Edition", ISBN: 978-1-118-35200-7. http://www.dummies.com/consumer-electronics/tablets/ipad/how-to-tap-flick-pinch-and-conrol-the-ipad-display/, May 2012.*

(Continued)

*Primary Examiner* — Pei Yong Weng
(74) *Attorney, Agent, or Firm* — David D. Brush; Westman, Champlin & Koehler, P.A.

(57) ABSTRACT

A method is provided for selecting, from at least two available modes, a mode of interaction between a user and a digital playback device. The digital playback device is capable of obtaining at least one item of information representative of a gesture performed by a user, the gesture being performed with the aid of at least one limb or of at least one part of a limb by the user. The method includes: obtaining a number of limbs or of parts of limbs used to perform the gesture; and when the number exceeds a first predetermined value, selecting a first mode of interaction from among the at least two available modes; and when the number is less than or equal to a second predetermined value, selecting a second mode of interaction from among the at least two available modes.

7 Claims, 10 Drawing Sheets

(51) Int. Cl.
  *G06F 3/01* (2006.01)
  *G06F 3/03* (2006.01)
  *G06F 3/0488* (2013.01)
(52) U.S. Cl.
  CPC .............. *G06F 3/04883* (2013.01); *G06F 2203/04106* (2013.01); *G06F 2203/04808* (2013.01)

(56) References Cited

U.S. PATENT DOCUMENTS

| | | | | |
|---|---|---|---|---|
| 5,583,543 | A * | 12/1996 | Takahashi | G06F 3/038 345/173 |
| 8,819,812 | B1 * | 8/2014 | Weber | G06F 3/017 726/18 |
| 9,021,402 | B1 * | 4/2015 | Li | G06F 3/04883 715/863 |
| 2003/0011638 | A1 * | 1/2003 | Chung | G06F 1/1626 715/808 |
| 2005/0275622 | A1 * | 12/2005 | Patel | G06F 3/04883 345/156 |
| 2008/0111710 | A1 | 5/2008 | Boillot | |
| 2009/0077504 | A1 * | 3/2009 | Bell | G06F 3/011 715/863 |
| 2009/0251425 | A1 * | 10/2009 | Sohn | G06F 3/041 345/173 |
| 2009/0273563 | A1 * | 11/2009 | Pryor | B60K 35/00 345/157 |
| 2010/0257447 | A1 * | 10/2010 | Kim | G06F 3/04883 715/702 |
| 2010/0309115 | A1 * | 12/2010 | Sabanai | G06F 3/04845 345/156 |
| 2011/0060986 | A1 * | 3/2011 | Yang | G06F 3/04845 715/702 |
| 2011/0141009 | A1 * | 6/2011 | Izumi | A63F 13/04 345/156 |
| 2011/0239118 | A1 * | 9/2011 | Yamaoka | G06F 3/017 715/709 |
| 2012/0056831 | A1 * | 3/2012 | Noda | G06F 3/04883 345/173 |
| 2013/0278499 | A1 * | 10/2013 | Anderson | G06F 3/01 345/156 |
| 2014/0089866 | A1 * | 3/2014 | Mongia | G06F 3/017 715/863 |
| 2016/0188181 | A1 * | 6/2016 | Smith | G06F 3/048 715/765 |

OTHER PUBLICATIONS

English translation of Written Opinion dated Mar. 19, 2015 for corresponding International Patent Application No. PCT/EP2013/069439, filed Sep. 19, 2013.
International Search Report dated Oct. 22, 2013 for corresponding International Patent Application No. PCT/EP2013/069439, filed Sep. 19, 2013.
French Search Report and Written Opinion dated Jun. 13, 2013 for corresponding French Patent Application No. FR 1258803, filed Sep. 19, 2012.
European Office Action dated Mar. 21, 2019 for corresponding European Patent Application No. 13765357.2, filed Sep. 19, 2013.

* cited by examiner

METHOD FOR SELECTING INTERACTIVITY MODE

CROSS-REFERENCE TO RELATED APPLICATIONS

This Application is a Section 371 National Stage Application of International Application No. PCT/EP2013/069439, filed Sep. 19, 2013, the content of which is incorporated herein by reference in its entirety, and published as WO 2014/044740 on Mar. 27, 2014, not in English.

FIELD OF THE INVENTION

The invention relates to the field of the interface between a user and a digital information-rendering device or information playback device. More particularly, the invention relates to the interaction between the user and a digital information-rendering device. Classically, a digital information rendering device in the meaning given to it by the invention can be understood to be a computer, a Smartphone, a digital tablet or a television set.

PRIOR-ART SOLUTIONS

Many digital information rendering devices are known. There are also many known techniques of interactions between these devices and users. For example, for computers, the best known means of interaction is the use of a mouse and a keyboard. Using a man/machine interface, the user can interact with software applications installed in his computer by moving and actuating the mouse as well as by using the keys of the keyboard. The use of the keyboard/mouse/screen threesome has become so commonplace that it is the reference for interaction tools between man and machine.

However, the home computer market has been profoundly affected by the marketing and success of new-generation terminals such as Smartphones and digital tablets. Users have massively adopted these terminals, leading to a redefinition of the usage of all other terminals. The necessity of using a computer is now limited to a few specific tasks while Smartphones and tablets are being used by one and all for consultation (email, documents, etc.), for gaming and for even some editing tasks which admittedly are as yet marginal.

Indeed, one of the problems raised by digital tablets and Smartphones is actually related the feature that makes them successful: the tactile interface. The tactile interface has popularized the use of Smartphones and tablets: the simplicity of use, the use of the fingertips, the simplification of interfaces and of applications has largely contributed to the success of these terminals.

However, the tactile interface with the machine intrinsically raises the problem of limitation of the interaction. Indeed, with a keypad and a mouse, there are numerous possibilities of interaction with the machine. More particularly, there are numerous possibilities of interaction with the applications: there are for example the mouse left click and right click, the mouse wheel, the combinations of keys of the keyboard, the joint use of keyboard combinations with the mouse, etc. All these possibilities of interaction offer solutions to users to facilitate or accelerate the tasks and actions to be accomplished. For example, the use of the copy and paste function is simplified by universal shortcuts such as "Ctrl+C" and "Ctrl+V". The use of the mouse wheel makes the editing screen scroll from bottom to top and from top to bottom.

By contrast, the use of the tactile interface is intrinsically limited. Although progress has been made, especially with the use of the technique known as the multi-touch technique enabling the user to use two or more fingers to perform certain actions, the use of fingers is limited to a few gestures: left, right, top, bottom, rotation, selection, etc., (besides, this aspect is part of the reason for its success).

This can be explained in many ways: on the one hand, firstly through what specialists call "direct handling" and "indirect handling", and secondly through the complexity of the memorizing of the touch gestures.

Direct handling and indirect handling relate to the way in which it is possible to interact with the terminal or the application. In direct handling, the motions and drawings made by the user serve to interact with the elements displayed on the screen. An example of direct handling is for example the use of the finger to make the screen scroll from right to left or from left to right as can be done in Smartphones and tablets. On the contrary, in indirect handling, the drawing or the motion to be made by the user serves to make a command (for example to insert an object into a document, open a document, etc.). This mode of use is very rare in present-day terminals used by the general consumer.

In addition, the passage from one mode to another is not easy when there is a touch screen available. Very often, developers provide tips to pass from one mode to the other, for example the presence of a physical button on the terminal or the presence of a button on the touch screen. To pass from one mode to the other, the user must touch this additional button on the device or the screen of the device, and this is neither user-friendly nor practical. In addition, most present-day devices tend to eliminate physical buttons, which are superfluous, so as to leave one and only one (on/off) button.

The other problem related to the tactile interface relates to the need to store a certain number of gestures and shapes. Indeed, certain gestures are of outstanding simplicity and require little effort of memorization on the part of the user. On the other hand, other gestures are substantially more complicated to memorize, especially when the total number of gestures to be memorized is great. It is conventionally estimated that, beyond about twenty gestures, the standard user is no longer capable accurately memorizing the gestures enabling interaction with the machine whereas shape recognition engines (integrated into applications or operating systems) can go well beyond this number of gestures. This is why the first Palm Pilot type personal digital assistants had relatively little success as compared with present-day terminals. It was indeed necessary at that time to use a correspondence table to memorize all the gestures needed to write numbers and the letters of the alphabet as well as other common signs, which, at a conservative estimate, represented about fifty gestures. Alternatively, this problem was resolved through the use of a virtual keyboard enabling the user to click with his finger (or an adapted stylus) instead of drawing the letters on the keyboard. Paradoxically, while there are many shape-recognition engines, some of which perform truly well, it is the human factor that limits the use of these shape-recognition engines.

Here, it can be understood why present-day tactile terminals are limited: by trying too hard to simplify use, developers have limited the immense possibilities of interaction with the machine. At present, the same problems are being encountered with interaction in stereoscopic cameras such as the very popular Kinect™ by Microsoft™.

SUMMARY

The invention does not have these drawbacks of the prior art. The invention proposes a method and a system making it possible not to limit interaction between the user and the machine by means of a tactile surface, a stereoscopic camera, etc.

The invention proposes for example a simple method of passage from direct handling to indirect handling. The invention also proposes a simple method for learning shapes by means of a tactile surface.

More particularly, the invention relates to a method for selecting a mode of interaction between a user and a digital rendering device from among at least two available modes, said digital rendering device comprising means for obtaining at least one piece of information representing a gesture performed by a user, said gesture being performed by said user by means of at least one limb or at least one part of a limb.

According to the invention, said method comprises:
  a step for obtaining a number of limbs or parts of limbs used to carry out said gesture; and
  when said number exceeds a first predetermined value, selecting a first mode of interaction from among said at least two available modes;
  when said number is smaller than or equal to a second predetermined value, selecting a second mode of interaction from among said at least two available modes.

According to one particular characteristic, said rendering terminal comprises a tactile surface and said at least one limb is a hand and said at least one part of a limb is a finger.

According to one particular characteristic, said rendering terminal comprises a stereoscopic camera and said at least one limb is an arm and said at least one part of a limb is a hand According to one particular characteristic, said first predetermined value is equal to said second predetermined value and said first predetermined value is equal to one.

The invention also relates, in at least one embodiment, to a customized method for recognizing gestures. According to the invention, such a method comprises the following steps:
  drawing of a gesture by the user and display of the drawing on the screen;
  at the end of the drawing, after a predetermined lapse of time (or following a withdrawal of the user's finger from the screen), display of the shape recognized by the recognition engine;
  depending on the type of command associated with the gesture—if it is immediate such as the insertion of an object—the action will be done at this step.
  display of a piece of data representing the recognized shape in an area near the end of the drawing made by the user, called a piece of visual feedback data.
  initializing of a validating time counter for a predetermined period of time:
    the validating time counter, in this embodiment of the invention, is implemented to carry out a gradual erasure of the piece of data representing the recognized shape, which can be an icon or a text explaining the recognized shape.
  when an action takes place after the lapse of the time defined by said counter, the recognized shape is validated.
    the command associated with the recognized gesture will be made at this step if it is of the "delayed execution" type.
  when an action takes place prior to the lapse of the time period defined by said counter, implementing a corrective mechanism.

The invention, in at least one embodiment, also relates to a method for correcting a recognized gesture. This method comprises:
  a step for initializing a corrective mechanism;
  a step for displaying a list of possible gestures;
  a step for selecting a gesture from the list of gestures;
  a step for displaying an action to be made by the recognition engine (forgetting the gesture or learning from a new drawing).

The different embodiments mentioned here above can be combined with one another to implement the invention.

According to a preferred implementation, the different steps of the method according to the invention are implemented by a software program or computer program, this software comprising software instructions intended for execution by a data processor of a relay module according to the invention and being designed to command the execution of the different steps of this method.

As a consequence, the invention is also aimed at providing a program capable of being executed by a computer or by a data processor, this program comprising instructions to command the execution of the steps of a method as mentioned here above.

This program can use any programming language whatsoever and can take the form of a source code, an object code or a code intermediary between source code and object code, for example in a partially compiled form or in any other desirable form whatsoever.

The invention is also aimed at providing an information carrier readable by a data processor and comprising instructions of a program as mentioned here above.

The information carrier can be any entity or device whatsoever capable of storing the program. For example, the carrier can comprise a storage means such a as ROM, for example a CD ROM or a microelectronic circuit ROM or again a magnetic recording means, for example a floppy disk or a hard disk drive.

Besides, the information carrier can be a transmissible carrier such as an electrical or optical signal which can be conveyed via an electrical or optical cable, by radio or by other means. The program according to the invention can especially be uploaded to an Internet type network.

Alternatively, the information carrier can be an integrated circuit board into which the program is incorporated, the circuit being adapted to executing or being used in the execution of the method in question.

LIST OF FIGURES

Other features and characteristics of the invention shall appear more clearly from the following description of a preferred embodiment given by way of a simple, illustratory and non-exhaustive example and from the appended drawings, of which:

FIG. 1 presents an illustration of an application for implementing the invention;

Figure 12:
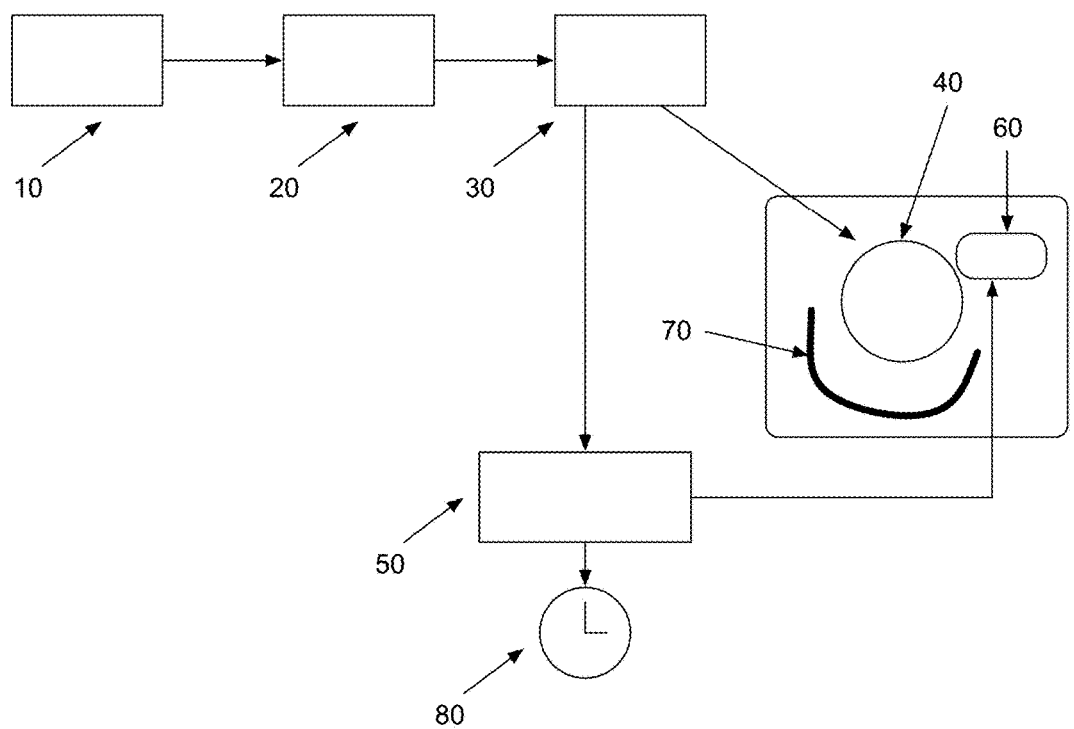
Figure 13:
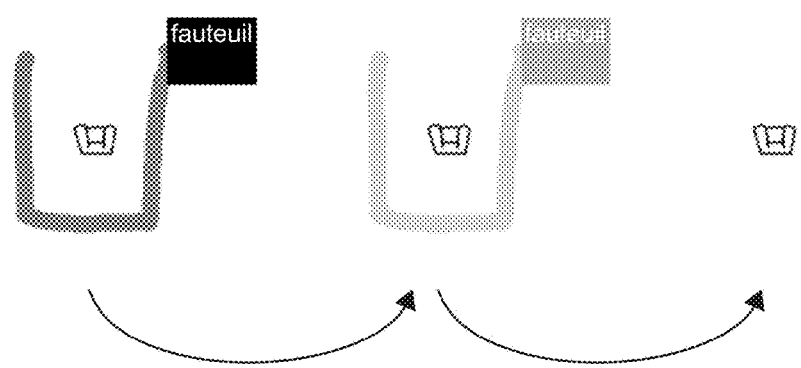
Figure 14:
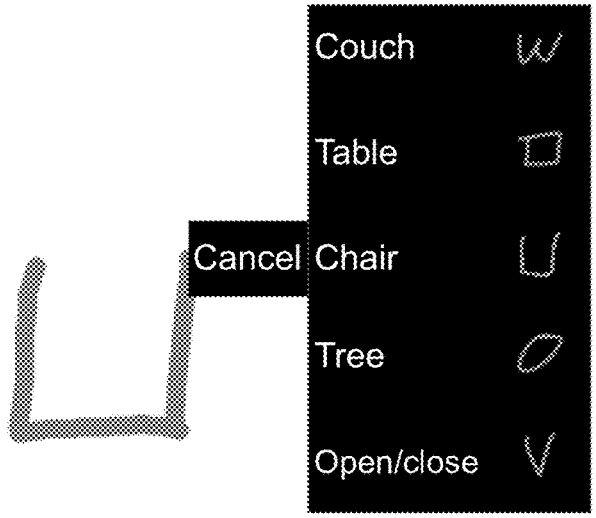
Figure 15:
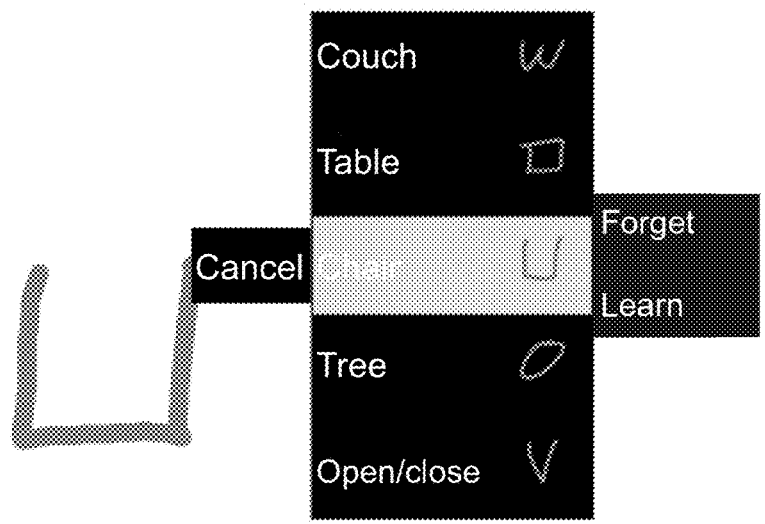
Figure 16:
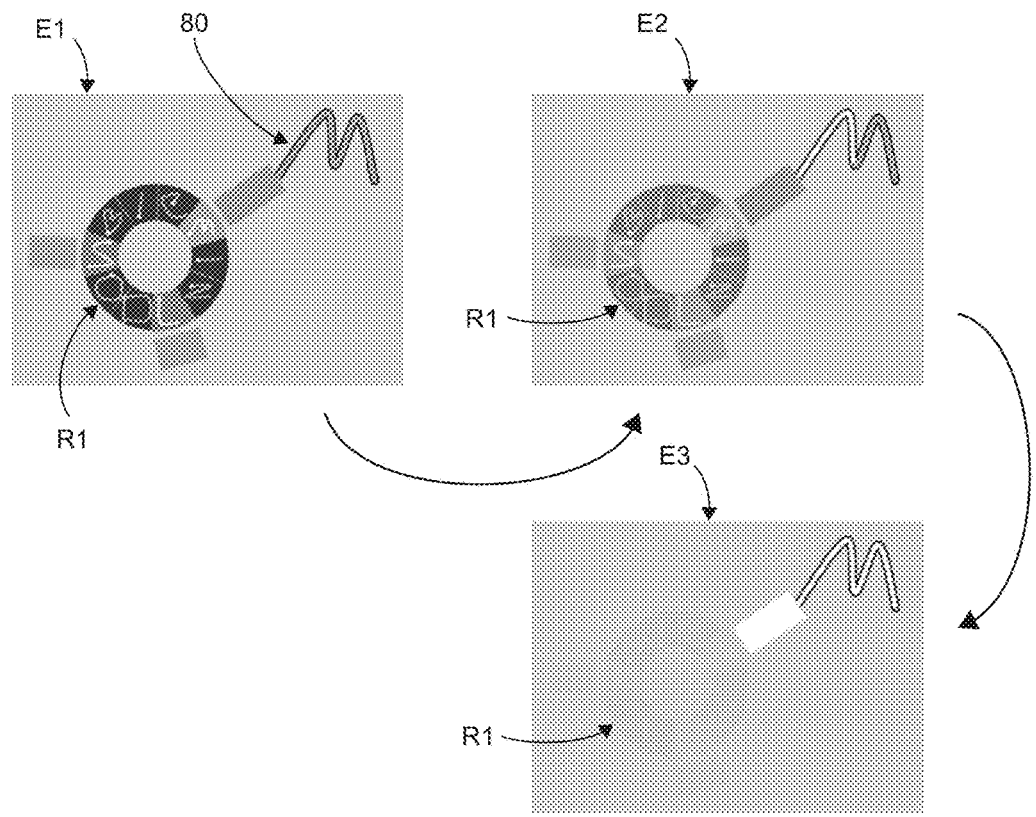
Figure 17A:
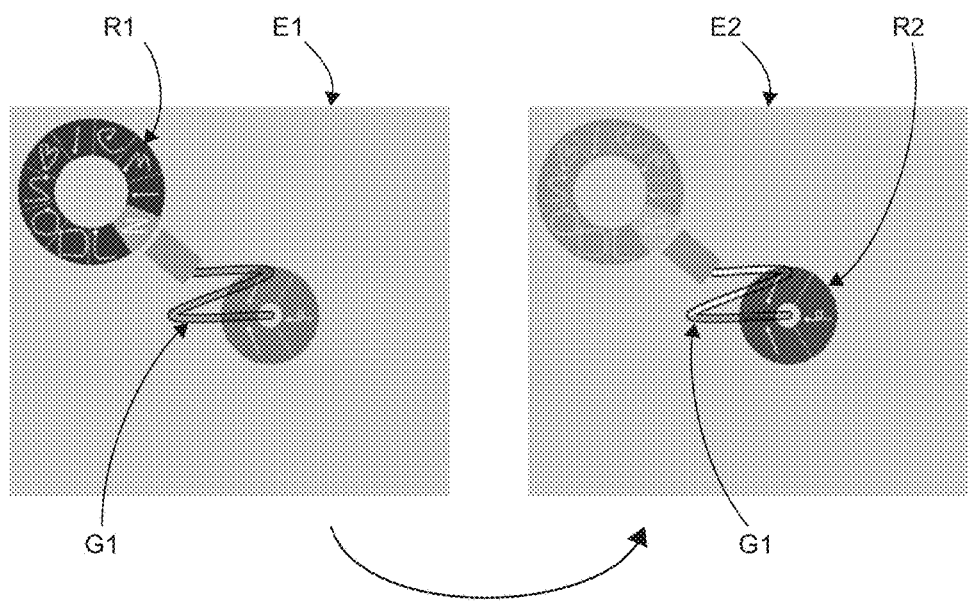
Figure 17B:
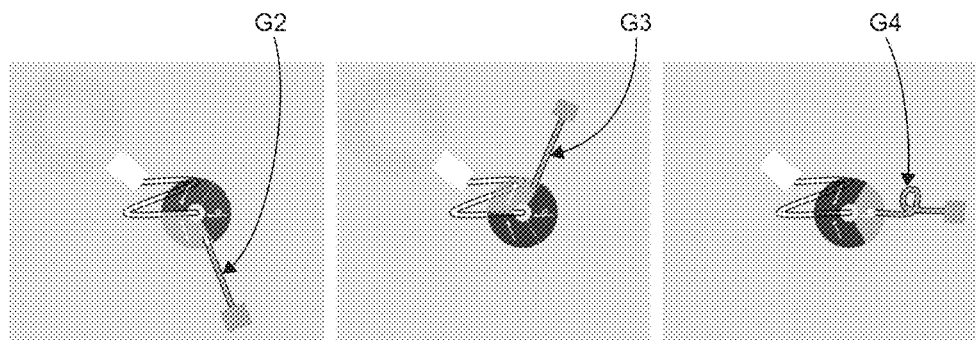
Figure 18:
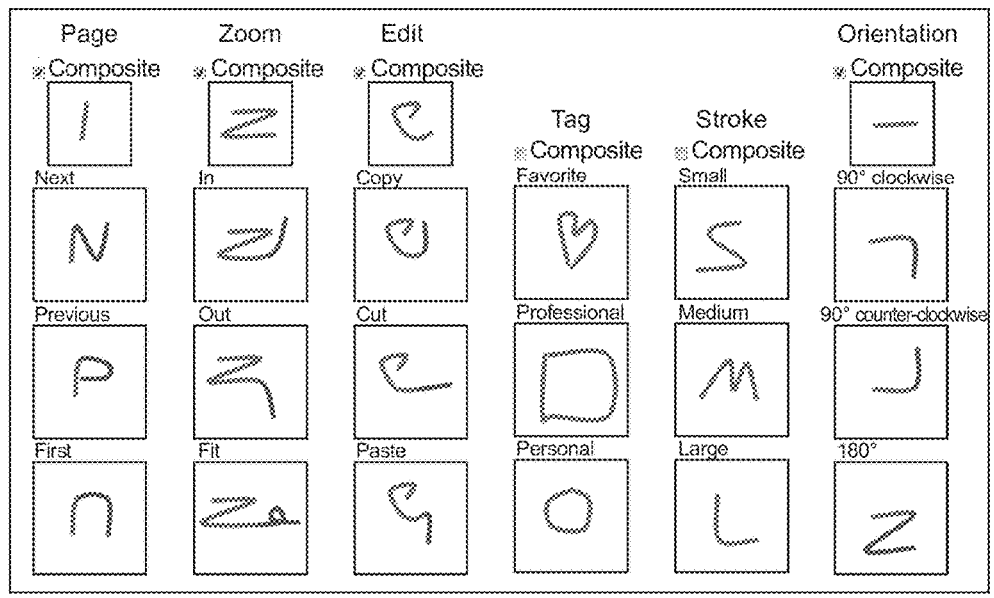

FIG. 12 describes the steps implemented for the recognition of a customized gesture;

FIG. 13 illustrates the gradual attenuation of the piece of data representing the recognized shape;

FIGS. 14 and 15 illustrate the mechanism of correction implemented to enable the user to modify the recognized gestures;

FIGS. 16 to 18 illustrate the storage of complex gestures by the user.

DETAILED DESCRIPTION 6.1 General Presentation

As explained here above, the invention proposes a method of interaction with a machine by means of gestures that are obtained by means of a gesture-capturing interface of the machine. This interface can be a tactile interface of a digital tablet. This interface can also be a stereoscopic camera.

The invention lies in the way in which the user's gestures are interpreted, the way in which the user's gestures are interpreted (to ensure that the machine gets used to the user) and the way in which the user learns the gestures expected by the machine.

A combination of these three novel methods can be implemented within one and the same application or within an operating system in order to provide a novel attractive experience of interaction with novel digital rendering devices.

However, each technique described can be implemented independently of the others depending on circumstances and problems to be resolved.

Figure 1:
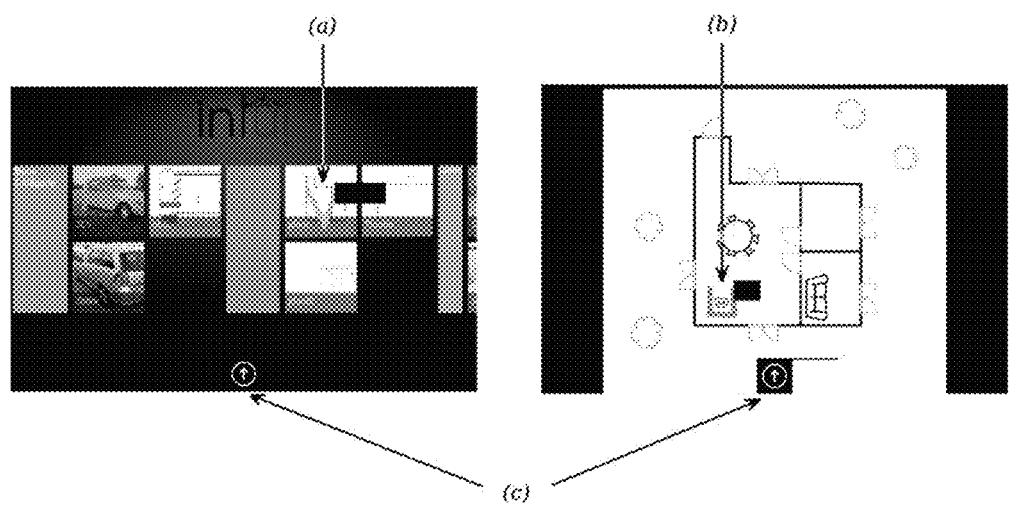
Figure 2:
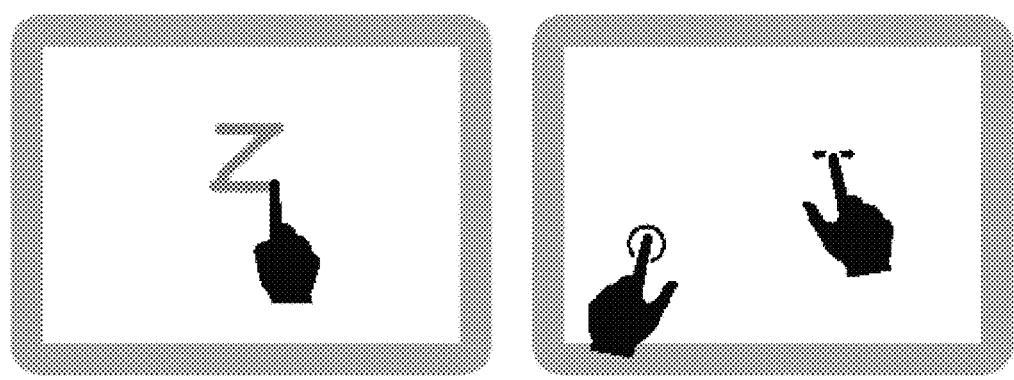
FIG. 2 illustrates the passage from a direct control mode to an indirect control mode.

To illustrate the problems and issues involved, we take the following example, purely by way of illustration, described with reference to FIG. 1. In FIG. 1, an application displays a list of documents which the user can scroll through (FIG. 1—drawing on the left). In this "list" mode, the user can classify the documents. Once classified, a document can be open in a specific full-screen editing mode corresponding to the assigned category as in FIG. 1 (drawing on the right). The example of FIG. 1 relates to a case of placing items of furniture in a plan of a house. In this document-editing mode, the user can insert a great variety of furniture and can organize the furniture in the plan.

From this example of an application, we identify three types of gestures that a user can draw in order to:

perform an action (categorization, opening and closing a document (FIG. 1-a));

inserting an object into the document (FIG. 1-b);

directly manipulating an inserted object.

The following table describes the principles of interaction for each of these types of gestures in terms of: display of the user's entry as a traced line when he draws a gesture; visual feedback; execution strategy.

TABLE 1

| Type of gesture | Visualized tracing | Visual feedback | Execution |
| --- | --- | --- | --- |
| Command | Yes | Name of the command | Delayed |
| Insertion | Yes | Name of object Insertion of object | Immediate |
| Manipulation | No | Continuous updating of the appearance of the object | Continue |

The implementation of the first two types of gestures (commands and insertions) relies on the use of a gesture-recognition engine.

Given the large quantity of gestures that could be needed in the context of a use done to scale, a specific instance of a recognition engine is used (and permanently updated) for each category of documents and/or applications. The gestures can be drawn differently from one user to another and the users can wish to add or remove gestures during the use of the application (without having to make a prior definition of all the gestures that would be used for this application).

Certain related studies propose systems to facilitate the customizing of gestures but only for the building of an application or for setting up a standard library of gestures. A present, none of the existing systems enables the final user to customize the gesture recognition engine.

Furthermore, in a current use, the user gradually changes the way in which he makes the gestures. A novice user starts by drawing his gestures carefully and slowly whereas he does it more while he does it more fluidly when he becomes an expert in the use of the gestures.

To cope with these requirements, the recognition system must evolve during its use in the application.

The inventors have had the idea of proposing the implementing of a recognition engine that evolves in operation and permanent learning, enabling new gestures to be learned through the learning of a few samples provided by the user. To this end, the inventors propose methods of interaction between the user and the device on the basis of a number of limbs or a number of parts of limbs used to interact. Concretely, for a tactile surface, the fingers are used. For recognition based on stereoscopic cameras, the arms and the hands are used to make the gestures.

The invention does not relate to the gesture-recognition engine as such but to the way in which the gesture-recognition engine must be implemented (i.e. used) so that the interaction with the user is simple and institutive and so that the user can use a digital rendering device with ease. The implementation that is the object of the invention is oriented along three distinct axes: passage from a direct handling mode to an indirect handling mode or vice versa; learning by the device of gestures specific to the user; learning by the user of gestures expected by the device.

6.2 Description of Embodiments

The embodiments presented here below are adapted to use on a touch screen by using one or more fingers. Thus, in these embodiments, the limb used is the hand and the limb portion used is the finger. It is also noted that the methods described also apply to a stylus when the user has such a tool. Besides, in these embodiments, only two modes of interaction are presented: the direct mode and the indirect mode. It is of course understood that, depending on the embodiment, several modes can be envisaged such as for example three modes. However, here below, two modes are considered to be available. Consequently, the first predetermined value has the value one and the second predetermined value is equal to the first predetermined value. In short, in this embodiment, it is sought to determine whether the user is using one or two fingers.

6.2.1 Direct Handling/Indirect Handling

In this first embodiment, the invention proposes a novel implementation of the passage from direct handling to indirect handling and vice versa. It may be recalled that direct handling, according to the invention, consists in deactivating the implementation of the gesture recognition engine. In the "direct handling" mode, the gestures drawn by the user are interpreted not by the gesture-recognition engine but by a simpler and specialized motion-detecting mechanism. In the "indirect handling" mode, on the contrary, the gesture-recognition engine is used to interpret and recognize the user's gestures and effect commands and/or actions corresponding to these gestures.

In other words, when the recognition engine is activated, the drawings made by the user are interpreted to carry out actions and/or effect commands (the operation is the indirect handling mode). When the engine is deactivated, the user's gestures are not recognized by it (this is the direct handling mode, in order for example in order to set up an automatic control link, via a transfer function, between the motions and the left-right scrolling on the screen, make rotations, etc.)

In the embodiment presented here, the users can make a gesture anywhere in the document during an action of insertion of a graphic object or symbol or make an action specific to the application. In this way, the insertion of an object in a document or the implementation of actions is speedy. However, in the case of a manipulation of graphic objects on the tactile interfaces, direct manipulation such as the translation of an object in making it slide with a finger is more natural for the user and must therefore be preferred.

It can be understood that it is not possible to enable the simultaneous manipulation of an inserted object (i.e. the operation is in direct handling mode) and the interpretation (the recognition) of gestures to enable the performance of the actions (for example the insertion of an object). To get around this limitation, the inventors have defined a method of temporary deactivation of the entry of gestures enabling the implementation of a set of techniques (also known) for the direct manipulation of graphic objects.

Changing of Mode: Passage from Direct Handling Mode to Indirect Handling Mode.

As explained here above, an efficient mode of switching between the direct mode and the indirect mode is a button: the user presses this button to pass from one mode to the other. The inventors propose instead a novel mechanism that is more intuitive and is less disturbing.

Besides, this mechanism is extremely simple: it consists in taking account of the number of fingers placed on the screen: when only one finger is placed on the screen, this is a first mode. When two fingers are placed, this is a second mode.

For example, according to a first embodiment, when only one finger is placed, this is the indirect handling mode and the engine is used to interpret the shifts of the finger. When two fingers are placed, this is the direct handling mode and the engine is not used to interpret the shifts of the finger.

For example, according to a second embodiment, when only one finger is placed, this is the direct handling mode and the engine is not used to interpret the shifts of the finger. When two fingers are placed, this is the indirect handling mode and the engine is used to interpret the movements of the finger.

In other words, the method consists in:
  obtaining the number of fingers used to make the gesture; and
  when this number is greater than one, selecting the first mode of interaction from among two possible modes;
  when this number is equal to one, selecting the second mode of interaction from among the two available modes.

The choice between the first and the second modes is not the only one possible. Other modes can be proposed. In fact, the invention lies in the interaction between the user and the device by means of an additional element proper to the user (here an additional finger) which will or will not be used to pass from one mode to another.

One specific embodiment of the invention takes advantage of the capacity of the screens known as "multi-touch" screens to count the number of fingers placed on the screen and adapt the behavior of the applications layer accordingly to enable or not enable the interpretation of the motions made by the user by means of the gesture recognition engine. In other embodiments, technologies other than the multi-touch technology are used to carry out this counting operation.

In one embodiment, presented with reference to FIGS. 2 to 8, touching the touch screen and keeping an additional finger on this touch screen enables passage pass into direct handling mode (FIGS. 2 to 4) and at the same time makes it possible to carry out the action associated with direct handling by using one or two fingers. This has the advantage of enabling the user to change mode by using the hand that is not being used to produce the gestures (for example the left hand for a right-handed person or the right hand for a left-handed person) anywhere, on whichever side the hand is placed relative to the device. The other hand remains free to manipulate the objects or carry out another operation relying on the touch that the application can offer. In the embodiment presented with reference to the previous figures, these operations relate to the scrolling of a list (in list mode) or to the manipulation of graphic objects in the document.

Thus, while the change of mode is physically explicit (associated with the number of contacts of fingers or identification of the number of limbs or parts of limbs used) it can appear in reality to be implicit for the user. In other words: from the user's point of view, there are no two distinct phases to be made to change modes and to make his command. From the user's point of view, the experience is rather one of simultaneity: the steps of changing mode and making the action in fact coincide with each other.

Thus, from the user's viewpoint (and also from the viewpoint of the system according to at least one embodiment), by changing modes, we are already in the position of carrying out the desired action and inversely by carrying out the desired action, we are implicitly making a change of mode.

The change of mode which is implicit from the user's viewpoint represents an advantage relative to the prior methods when it is appreciably simpler to implement.

Selection and Translation of Objects

Figure 6:
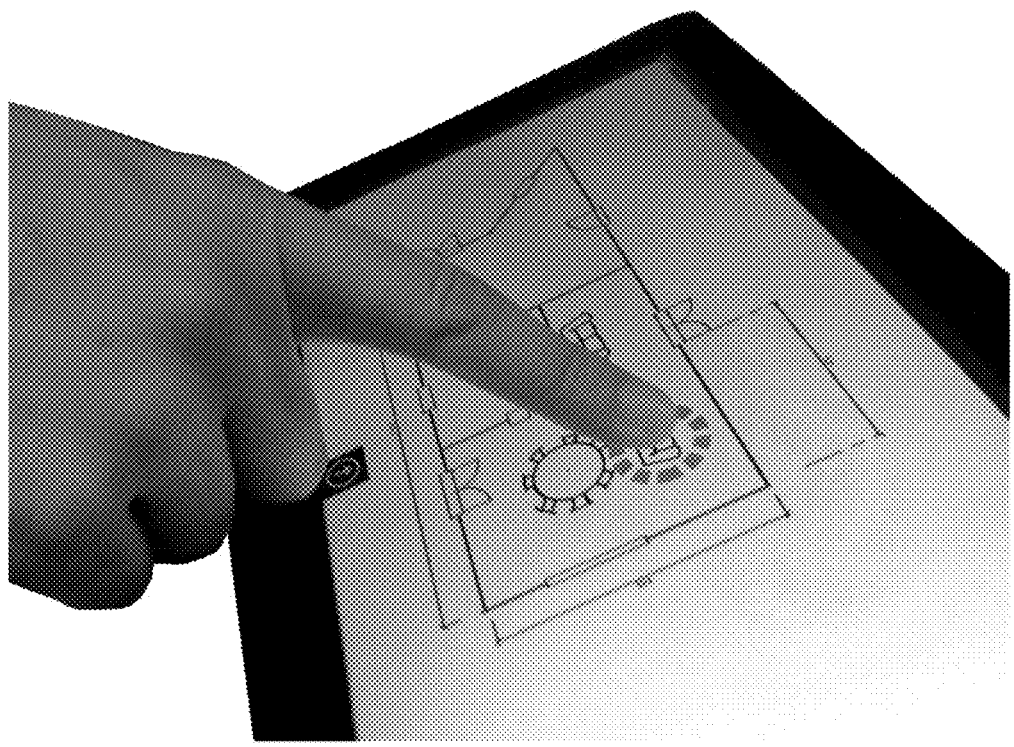
FIGS. 6, 7 and 8 illustrate the direct manipulation of an object in order to shift it on a document with a finger.
Figure 7:
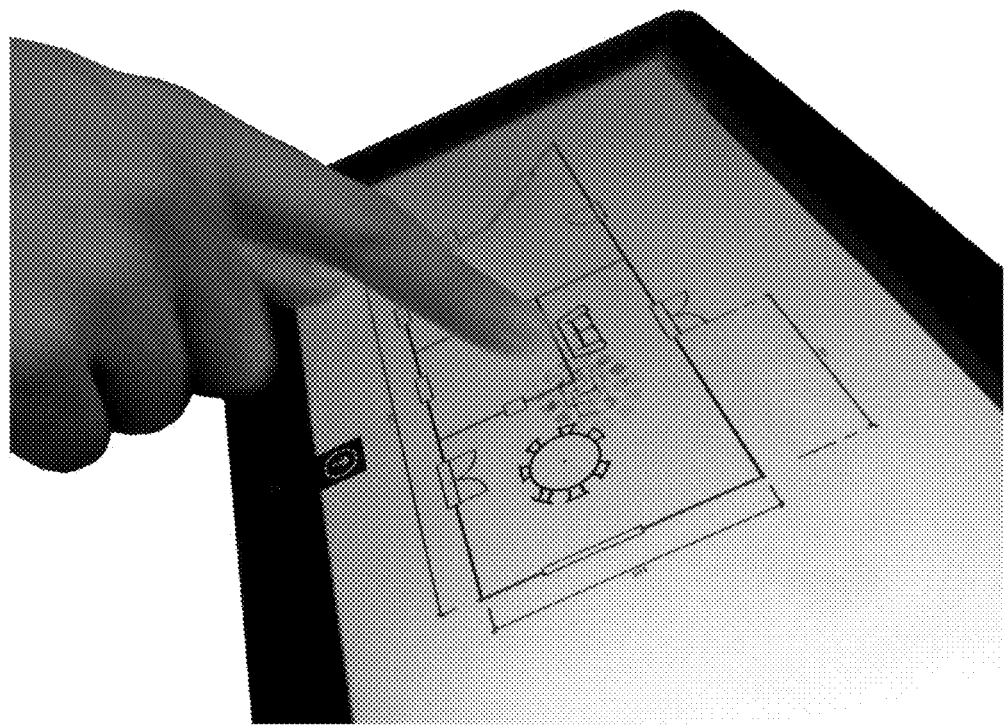
Figure 8:
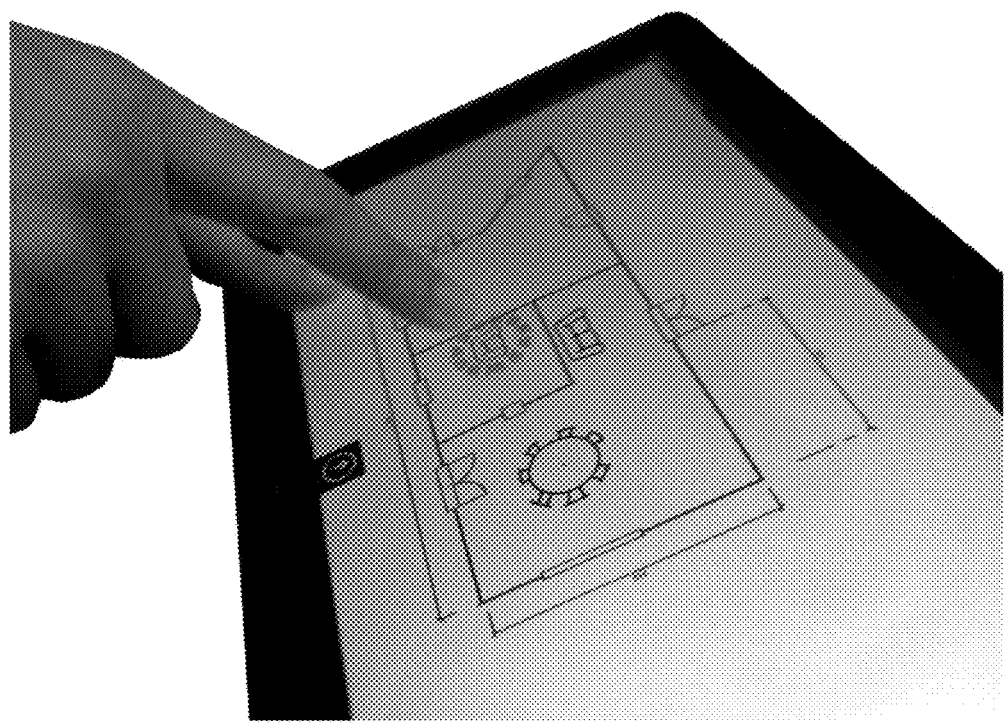

In the embodiment presented with reference to the figures, in the direct mode, the user can manipulate the graphic objects in a document. The first essential operation is that of selecting such an object. This is done by pressing on an object. A colored border surrounds the selected object, providing a visual feedback indicating both the passage into direct handling mode and the selected object. Thereafter, it is enough to tap another object to deselect the previously selected object. Once selected, or directly after the selection, the contact and sliding of the finger causes a shift of the object selected in the document (FIGS. 6 to 8). The object follows the finger during the motion and remains in place when the finger is lifted.

Action of Scaling and Simultaneous Rotation

During the insertion of graphic objects by using gestures, the object is placed with a default size and orientation that the user could thereafter wish to adjust. To this end, the inventors propose a technique of manipulation combined with the rotation and scaling of the objects around their centre. While the system is still switched to direct mode, and after the object has been selected, the touching and shifting of a finger relatively to the centre of the selected object modifies the object both by scaling and by rotation.

Figure 3:
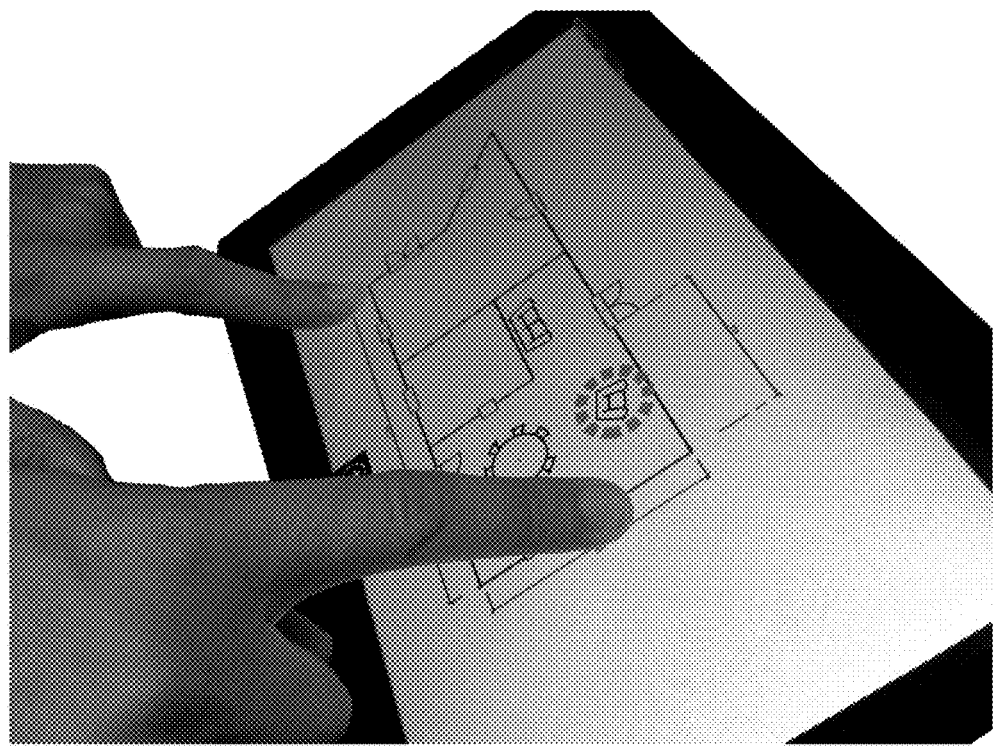
FIGS. 3, 4 and 5 illustrate the resizing and the elimination of an object in direct handling mode.
Figure 4:
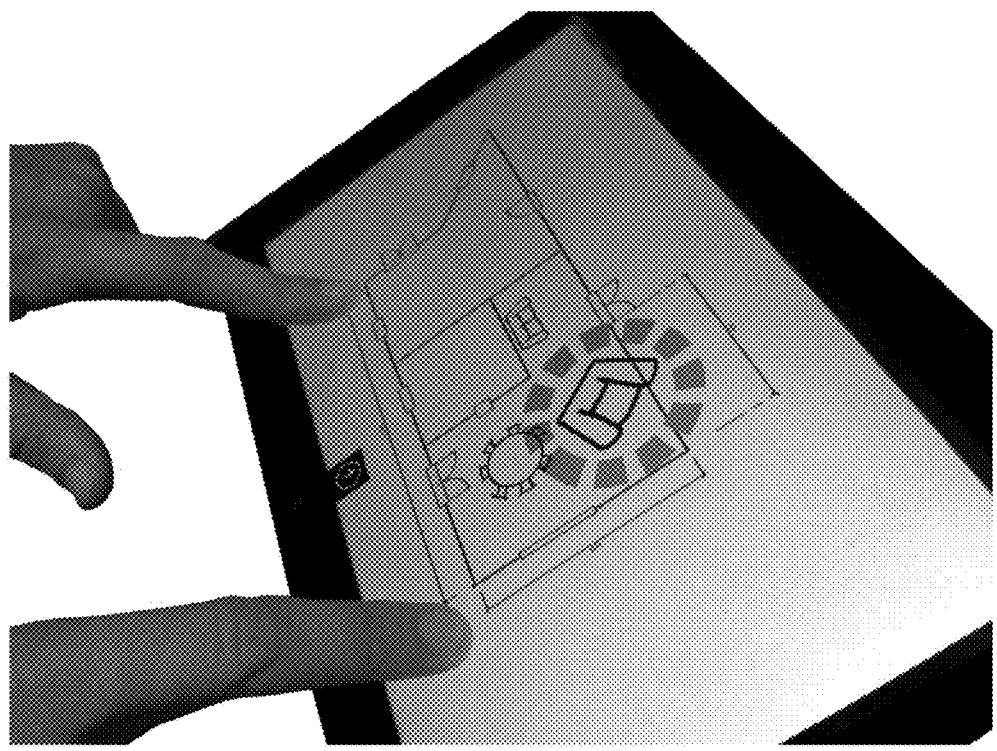

Shifting the finger near the centre of the object reduces it and vice versa. Simultaneously shifting the finger circularly around the object will cause the object to turn accordingly (FIGS. 3 and 4). These operations of manipulation are done at a distance from the manipulated object, thus preventing the effects of the masking of the object by the finger or the hand.

Elimination of Objects

Figure 5:
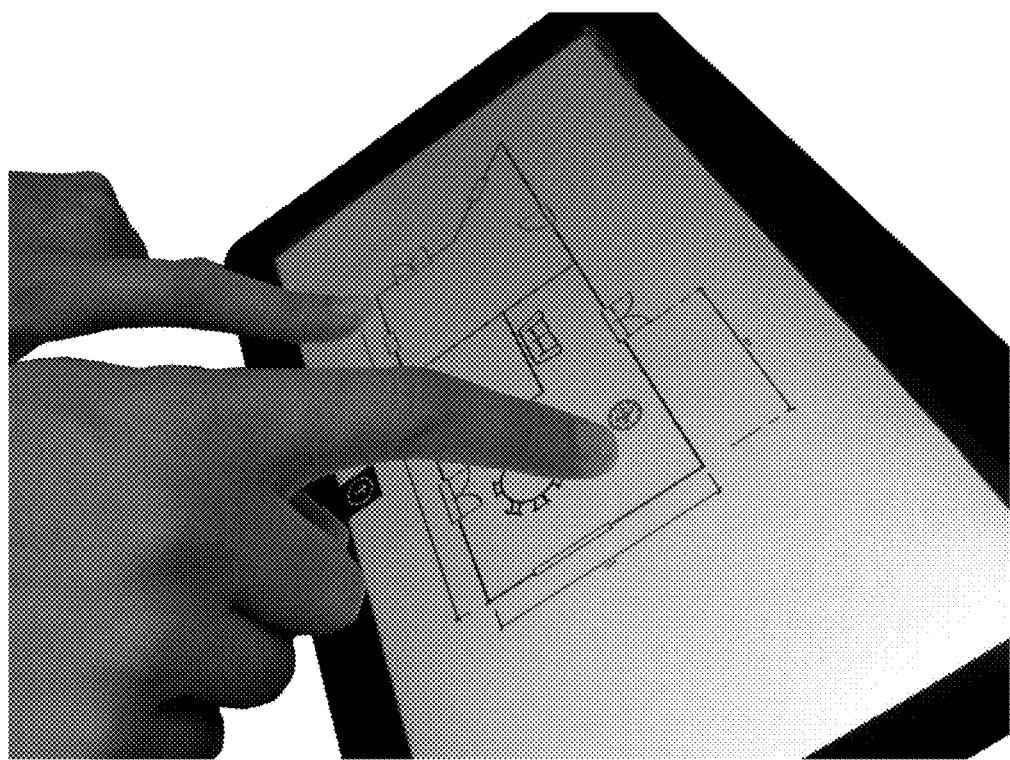

When editing a document, the user can create an object with a gesture and update its position, size and orientation by using the direct handling mode but may wish to eliminate an object. In this embodiment of the invention, an object is implemented as a particular case of the scaling operation. When the scaling leads to a reduction below a predetermined minimum size, an elimination icon appears on the object (FIG. 5). When the user lifts his finger, the object is eliminated from the document unless it has been again scaled above the minimum size.

Copying and Pasting

One of the essential actions that it is absolutely necessary to possess for a system is the "copying/pasting" function. The systems in which this action is lacking are generally unappreciated by the public (this was so for example when the first iPhone appeared).

According to the invention, as an alternative to the adding of an object by drawing a gesture, it is possible in editing mode (i.e. in direct mode) to copy and paste objects. The technique is very simple: after placing a finger on a vacant space to provide for a passage to direct mode, the user selects an object by pressing on it with a second finger and then again taps in an empty space of the document to copy the object with the same scale and the same orientation as the original object.

Other Characteristics and Advantages

Thus, as can be seen in this embodiment, the invention enables a simple passage from a direct handling mode to an indirect handling mode by means of additional element proper to the user (for example an additional finger). Naturally, this explanation has been made in assuming that only two modes alternative to each other exist. The invention can be implemented with a number of modes greater than two. It is enough for example to use only one finger for the first mode, an additional finger for the second mode, and so on and so forth In addition, it is interesting to specify that the passage from one mode to another is not necessarily done by keeping the finger in a fixed position. Both fingers used can be in motion. For example, the simultaneously motion of two fingers on the screen can give a scrolling operation. The same scrolling can be done by keeping a finger placed statically while a second finger is in motion. This is naturally only an example applied to scrolling. Other situations and motions can also be envisaged.

Besides, other embodiments can also be envisaged. For example, in an alternative mode, the passage from one mode to another can be commanded by the gesture-recognition engine itself. More particularly, the passage from the indirect mode to the direct mode can be commanded in this way. It is thus possible to draw a gesture in indirect mode, and this gesture, once recognized by the engine, enables passage into direct mode and therefore enables interaction with an object.

6.2.2 Learning of Customized and Evolving Gestures

The use of a recognition engine in conjunction with the invention makes it possible to implement a highly simple method for learning (and therefore recognizing) customized gestures. More particularly, in this embodiment, the inventors propose a system and a method for defining gestures which will then be recognized by the gesture recognition engine. In this embodiment, the machine is taught how to recognize the user's gestures. More particularly, there is a method available for defining gestures intended for the gesture recognition engine. According to the invention, there are two methods for defining and learning customized gestures:

explicit learning;
implicit learning.

Explicit Learning

Explicit learning is described with reference to FIG. 1 and FIGS. 9 to 11.

The invention, in this embodiment, gives the user the possibility of defining his own library of gestures for various activities. Since the gestures are defined by the user, there is need for a mechanism enabling the gesture to be defined but also a mechanism for searching for gestures in the reference library. To provide the user with the control of his library of gestures, it is also necessary to make this mechanism easily accessible at all times and easy to use. To this end, the invention proposes a gesture control panel designed to meet these needs.

Figure 9:
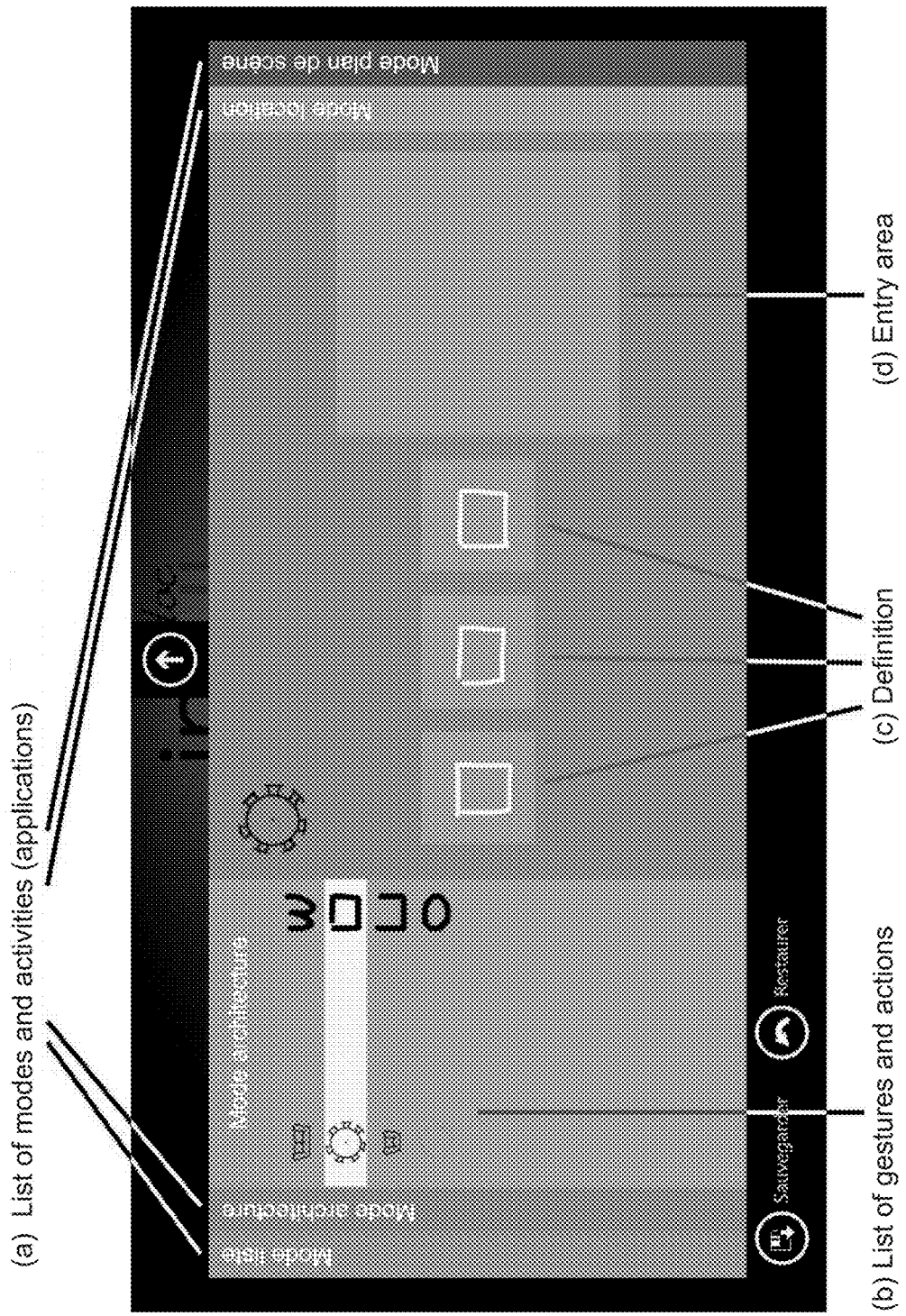
FIG. 9 illustrates the explicit learning interface.

Gesture Control Panel (FIG. 9)

The gesture control panel in the application is a form that is always available for consultation and for editing the gestures defined by the user. It can be activated by pressing on a "fast access" key always visible at the bottom of the screen (FIG. 1-c, the fast access key is represented by the arrow surrounded by a circle). During activation, the control panel slides and is displayed as a shutter (FIG. 9). This access by means of a fast access key is always present and always accessible (not masked) and helps to identify the gesture control panel in the context of the system rather than having the gesture control panel as part of an activity or an element of the list mode.

Since the actions to be made can be completely different between the activities (applications) and since the activities (applications) are modal (i.e. presented to the user on a full screen and one at a time), the sets of gestures are independent. This means that a set of gestures can be defined for one activity (or one application) while another set of gestures can be defined for another activity (another application).

Thus, the user can choose to define the same gesture to be made for different actions without any interference between the activities (applications). To take account of these numerous sets of independent actions, the control panel has a horizontal accordion enabling the management of exactly one list of gestures per activity (one for the list mode and one for each activity (FIG. 9-a)). A single gesture is edited at a time from this list.

In this embodiment, the pages of the accordion are color coded to correspond to the color of the activity (the application) as can be seen in the list mode. Naturally, this is only one example of an embodiment and it is possible to propose another presentation depending on needs, constraints, and the "look and feel" of the operating system.

Certain gestures can be shared among all the activities and the list mode. This represents common actions which exist in all activities. In the present example of application, all the activities and the list mode have two gestures in common: the gesture of opening/closing and the gesture of cancellation. Since these two gestures are shared overall, the user can find them and edit the corresponding gestures in the list mode pages of the gesture control panel but these actions are not displayed in tabs specific to the activities (or applications). This is a particular embodiment. It is also possible to propose a presentation of gestures as being "pinned" for all the pages of the list mode.

Editing of Customized Gestures

In this example of an embodiment, each page of the gesture control panel presents the user with a list of actions available for an activity (application) or the list mode (FIG. 9-b). A selection of a gesture in the list of the gesture control panel displays the samples of gestures to define the gesture and enable the edition of these samples.

Figure 10:
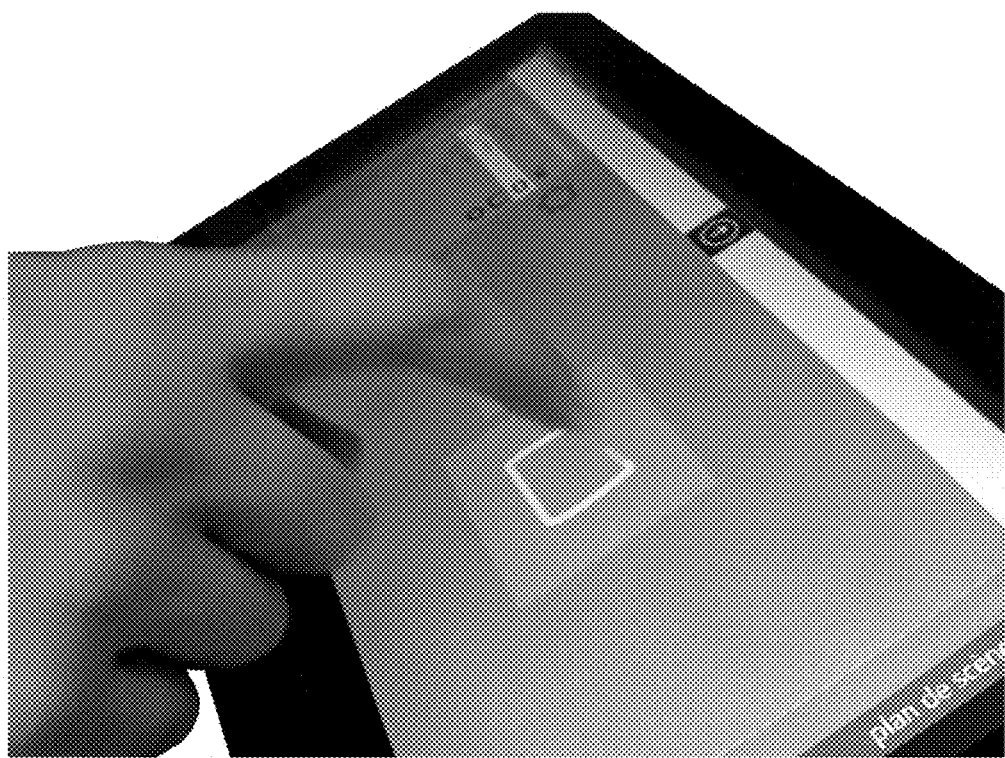
FIG. 10 illustrates the way in which a gesture is entered.
Figure 11:
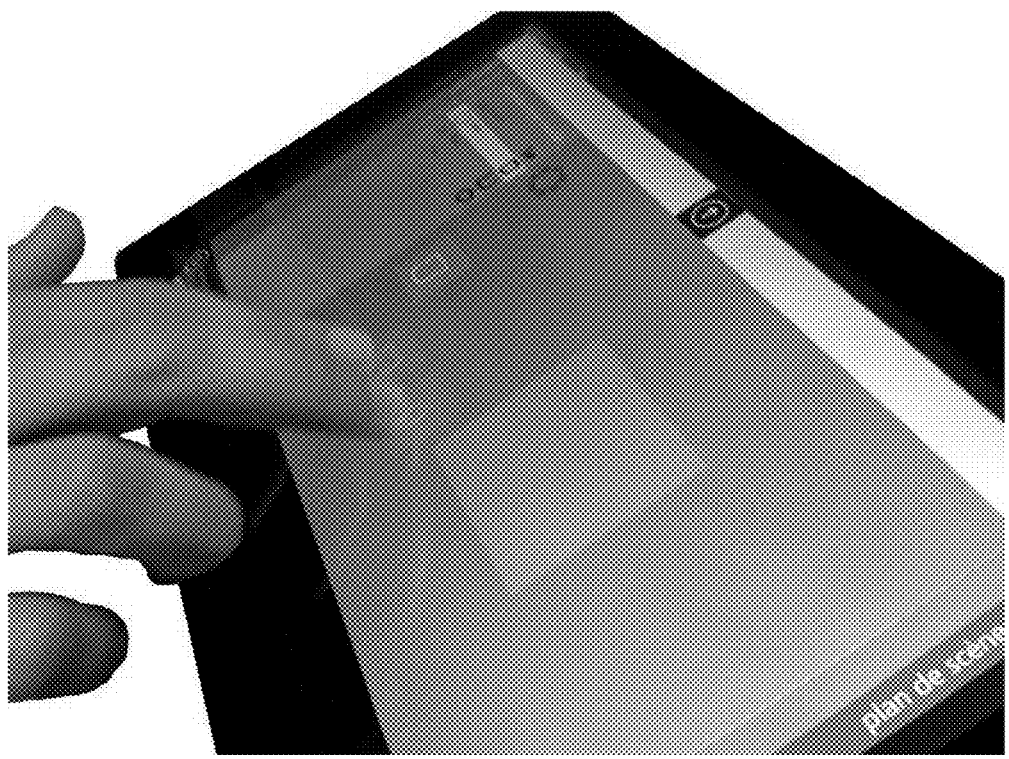
FIG. 11 illustrates the way in which a gesture is eliminated.

The existing samples are displayed in a horizontal list called a list of definitions of samples (FIG. 9-d) with a bigger drawing area to draw a new sample (FIG. 9-c). The drawing of a sample of a gesture in this area adds the sample to the definition of the gesture (FIG. 10). Visually, the user's entry "shrinks" in the list of definition of the samples. If a sample of a gesture of the list appears to be poorly drawn or if the user wishes to change his gesture, then a sample of a definition can be eliminated from the list by making it slide upwards or downwards in the list (FIG. 11). The list of gestures of the panels presents a glimpse of the gesture which is updated when the samples of definitions of the gestures change. An empty list of definitions of samples means that the gesture is deactivated.

The closing of the control panel activates a re-computation (by the recognition engine) of the modified gestures so that the new or modified gestures can be immediately used for the gestural actions in the activity or application concerned.

Inter-applicative Integration

This is a common paradigm in the operating systems of the main actors in the industry (iOS, Android, Windows Phone 7 and Windows 8) for providing a "shell" (meaning a software layer that provides the user interface with an operating system) for independent applications and in full screen where the user can perform various activities.

In at least one embodiment, the invention enables all the applications to be made compatible with the use of gestures for the gesture-based commands (such as keyboard shortcuts found in desktop computer environments) or contact by means of more precise gestures (such as the insertion of graphic objects in a document). The invention, in at least one embodiment, enables the user to define a personal library of gestures independently of the applications and their functions, making gesture recognition a part of the user's overall experience with tactile (or similar) devices.

Indeed, the application which implements the gesture control panel simulates a graphic shell to integrate the user's library of gestures in the overall tactile experience. Thus, the gesture control panel is directly integrated into the graphic shells of the Smartphones and tablets. The applications can thus explain certain of their functions in order to be associated with gestures that the user can define and manage on the basis of a single and consistent interface.

Implicit Learning

The implicit learning is done as and when the gesture is used by the user. More particularly, the implicit gesture is implemented continuously during the user's (automatic) acceptance or refusal following the drawing of a gesture. This implicit learning phase is described more particularly here below.

6.2.3 Recognition of Customized Gestures

The mechanism of recognition of customized gestures is based on the user's (automatic) acceptance or refusal following the drawing of a gesture. In this embodiment, the invention takes the form of a method of interaction with a gesture recognition engine in indirect manipulation mode.

More particularly, the method comprises the following steps, described with reference to FIG. 12:

drawing (10) of a gesture by the user and display (20) of the drawing on the screen;

at the end of the drawing, after a predetermined period of time (or following the removal of the user's finger from the screen), the display (30) of the shape (40) recognized by the recognition engine;

depending on the type of command associated with a gesture—if it is immediate such as the insertion of an object—the action will be performed at this step.

display (50) of a piece of data representing the recognized shape (60) in an area near the end of the drawing made by the user (70), called a piece of visual feedback data.

initializing of a validation time counter (80) for a predetermined period of time (included for example between ½ a second and 2 seconds).

the validation time counter, in this embodiment of the invention, is implemented to carry out a gradual erasure of the data representing the recognized shape (60), which can be an icon or a text explaining the recognized form.

when no action takes place at the end of the passage of the time period defined by said counter, the recognized shape (40) is validated.

the command associated with the recognized gesture will be performed at this step if it is of the "delayed execution" type.

when an action takes place prior to the passage of the time period defined by said counter, implementation of a corrective mechanism (described here below).

The different steps of the method are described in detail here below.

Step for Displaying the Piece of Data Representing the Recognized Shape

In one embodiment of the invention, during the preparing of a gesture (for example during the drawing), precisely when the user lifts his finger, he is presented with a simple feedback which comprises the name of the action that corresponds to the recognized gesture. This feedback is the piece of data representing the recognized shape.

In this embodiment, this feedback takes the form of a highlighted rectangle placed at the end of the gesture (FIG. 13). The gesture traced or the piece of data representing this gesture remains visible for 1.6 seconds before it gradually disappears as illustrated in FIG. 13. This positioning and the transitory nature of the representative data (the transitory nature is illustrated by the fact that the representative data gradually disappears) enable an increased observation on the part of the user while at the same being non-blocking and non-intrusive.

In addition, the visual continuity of the trace of the gesture (i.e. the continuity of the display of what the user has drawn) and the feedback (the display of the data representing this gesture) set up a logical link between the drawing made and the gesture.

Once the drawing has been made and once the piece of data representing the recognized shape has disappeared, it is assumed that the user has received the necessary information and that the recognition is implicitly validated (the recognition engine then automatically reinforces its knowledge in this sense).

As explained in table 1, a distinction is made between the delayed-execution commands and the immediate-execution commands, such as insertion of objects. Although the display method remains the same, a delayed command is executed only when the feedback disappears while an insertion of an object takes place immediately.

The object of this method of display is to give the user time to correct the gesture for commands that cannot be naturally cancelled.

Corrective Mechanism for the Recognized Shape

When a gesture is drawn by the user, an error of recognition can take place. There can be two reasons for these errors: the user has poorly drawn the gesture (for various reasons ranging from physical difficulty to forgetting the gesture) or the recognition engine is mistaken. The inventors have had the idea of allowing the use of these two types of error in respectively making it possible to forget the entered (or drawn) input or to learn this input.

However, the user's action is necessary to identify these two situations. Thus, a corrective mechanism in several steps is proposed (FIGS. 14 and 15). This mechanism is activated by carrying out an action prior to the elapsing of the time period defined by the time counter. In one embodiment, the mechanism is activated by pressing (clicking) on the piece of data representing the recognized shape before it disappears (this is the initialization step). A list of all the gestures available in the context of the application being executed is then displayed beside the gesture name (this is the presentation step). The list comprises the names of the gestures as well as the miniature images of the gestures for a comparison with the gesture drawn by the user (alternatively, only the miniatures can be represented, thus enabling the method of the invention to be adapted to small-sized screens). The user can select the gesture planned by tapping on the list (this is the selection step). Once the right gesture is selected, the third step implements a display of two options so that the user can indicate the type of error, i.e. a poor drawing or an error of recognition, in requesting the engine respectively to forget or learn the drawn entry.

In other words, the corrective mechanism comprises:
a step for initializing the corrective mechanism;
a step for displaying a list of possible gestures;
a step for selecting a gesture in the list of gestures;
a step for displaying an action to be performed by the recognition engine (forgetting or learning).

6.2.4 Memorization of Complex Gestures by the user

In addition to the definition of customized and intuitive gestures, the invention also makes it possible, in at least one embodiment, to learn the gestures expected by the visual recognition engine. The gestures in question can be single-block gestures (i.e. single gestures) or multi-block gestures (i.e. complex gestures formed by the sequencing of several single-block gestures). Complex gestures have for example common roots between gestures of the same family. In this embodiment, it is sought to help the user in his learning of gestures that are expected by the machine (this situation is therefore the reverse of the one presented previously in which the user draws his own gestures).

The basic assertion of this embodiment of the invention is the following: the graphic shape of the gestures integrates the semantics of a hierarchy of commands (factorization of the start of the drawing of the gestures associated with the same common command/root family for the drawing of gestures of a same family of commands). More generally: for certain gestures associated with the commands of same family, it can be worthwhile to factorize (a common graphic root is used to identify the family of commands, this is a first single-block gesture). The differentiation is then made in the continuation of the drawing in following on with another single-block gesture (which therefore enables an identification of the command within the family). By contrast, for the other gestures, even within a same family of commands, it can be preferable to preserve, for each of them, completely different drawings (that are easier to memorize, manipulate and identify).

According to the invention, the proposed gestural menu for help with memorization makes it possible to:
reconcile these two ways of conceiving these gestures by graphically highlighting (according to two complementary methods) these semantic elements (hierarchical organization) for the user in the context of families of commands;
assist the user in learning these gestures by encouraging him to make drawings of gestures when he wishes to use this gestural help menu.

To this end, the invention implements firstly a combination of specific display techniques and secondly a simplified interface. One embodiment of the invention is presented with reference to FIGS. 16 to 18. The basic idea of this embodiment of the invention is based on the observation that a complex gesture defining an action which is itself complex is a succession of simplified gestures (single-block gestures).

Referring to FIG. 16, we present an example of a single-block gesture. More particularly, FIG. 16 presents a drawing 80 representing a single-block gesture. As explained here above, a gesture, whether it is simple (single-block) or complex (a sequence of single gestures), corresponds according to the invention to an action to be performed in an application. In FIG. 16, the single-block gesture 80 enables the selection of a pencil thickness. In other examples, this gesture enables the opening of a predefined application, the opening of a dialog box, etc. These examples are only illustrative and in no way restrict the scope of the method described.

Starting from the observation that a complex gesture is a succession of simple gestures, the inventors had the idea of sub-dividing the learning of the complex gestures into a learning of a succession of simple gestures. To this end, a first step consists of the display, at a predetermined location of the screen, or at the location of the user's stylus/finger when he keeps it on the tactile surface, of a set of predetermined simple gestures. This display can be done in the form of a wheel, comprising the set of simple gestures. In the example of FIG. 16, for the single-block gestures, a wheel R1 is successively presented in three successive views (E1, E2, E3). As illustrated in this embodiment, only the gestures pertaining to a given context are highlighted. When the user starts tracing the gesture (in this case the gesture 80), the wheel fades out (view E2) and only the gesture that the user has started tracing remains displayed. Then, when the user has completed his tracing (view E3), the wheel R2 has practically disappeared and only the gesture remains visible.

Thus, a wheel comprising a few simple gestures is displayed at the centre of the tactile area. The user goes through this wheel to select the gesture that he is searching for. The user then validates his selection by following the trace of the gesture (i.e. by performing the gesture).

In a second embodiment, presented with reference to FIGS. 17A and 17B, two single-block gestures (G1 and G2 or G1 and G3 or G1 and G4) are successively traced to obtain a complex gesture (G1+G2 or G1+G3 or G1+G3). A first portion of the complex gesture is recognized through the help of the wheel R1 (this is the initial single-block gesture denoted as G1, view E1). In a second phase, to continue the learning process, the second wheel appears (view E2, wheel R2). It also comprises a certain number of simple gestures (three in the example illustrated). These three single-block gestures in the wheel R2 correspond to three sub-commands of the command associated with the gesture G1. Intuitively, the user is requested to continue his gesture by tracing a second simple gesture on the screen. The method of the invention is then again implemented (FIG. 17B): depending on the gesture traced, the engine selects firstly a subset and then a single gesture (G2, or G3 or G4).

The complex gesture is then defined (GC for example formed by G1 and G2). This process of learning by the user through a succession of simple gestures is obviously far more intuitive than the process of learning in blocks, as has been proposed in the methods of the prior art. The method of the invention enables the user to learn by the practice and observation of numerous complex gestures making it possible for example to swiftly carry out the actions in the applications.

The principle here is that so long as it is possible to continue the complex gesture to define an action, a new wheel appears when a simple gesture has been defined. In one embodiment of the invention, the number of elements of the first wheel displayed corresponds to the number of menus of the application (for example the "Home", "Insertion", "Edition" and other menus). The second wheel displayed corresponds to the menus of the initially recognized menu (for example if the first simple gesture has enabled recognition of the "edition" menu, the following wheel comprises for example the elements corresponding to the actions "select", "select all", "cut", "copy", "paste". Thus, all the complex gestures corresponding to an action of the edition menu begin with the same simple gesture and only the termination of the complex gesture (i.e. in the example the second simple gesture) makes it possible to precisely identify the action to be performed.

Alternatively, for small-sized screens (such as those of Smartphones), the wheels are not all displayed. When the simple gesture has been recognized, the wheel corresponding to this gesture is either erased from the screen or reduced in order to enable the display of the following wheel.

Conversely, for large-sized screens, it is possible to leave the successive wheels permanently displayed.

More generally, as presented with reference to FIG. 18, the actions are categorized and hierarchically organized, for example by the user or again by the developer of the application. In FIG. 18, actions related to the management of the pages, zooming, edition, etc. are presented as being "composite" actions which are actually complex gestures (comprising at least two single-block gestures). The complex gestures ("next", "previous", "first") have for example a common root which is thereafter used to compose the gesture in question. FIG. 18 again shows the gestures associated with zooming, presented with reference to FIGS. 17A and 17B and the gestures relating to the size of the line of the drawing ("small", "medium" and "large") presented with reference to FIG. 16. These gestures relating to the size of the line of the drawing are not categorized (they are not composite gestures).

If the user or the developer wishes to make these gestures composite gestures, he can tick off the "composite" box and then define a root common to these gestures.

Thus, the invention greatly facilitates firstly the configuration of the gestures for one or more given applications and secondly the ease with which these gestures can be learned.

Although the present disclosure has been described with reference to one or more examples, workers skilled in the art will recognize that changes may be made in form and detail without departing from the scope of the disclosure and/or the appended claims.

The invention claimed is:
1. A method comprising:
   selecting a mode of interaction between a user and a digital rendering device from among at least two available modes, wherein selecting comprises the following acts performed by the digital rendering device:
   obtaining, by a gesture capturing interface of said digital rendering device, at least one piece of information representing a gesture performed by the user, said gesture being performed by said user by using at least one limb or at least one part of a limb;
   counting from the obtained information a number of limbs or parts of limbs used to carry out said gesture;
   selecting a mode of interaction of the digital rendering device from among said at least two available modes as a function of the number, wherein selecting comprises:
      when said number exceeds a first predetermined value, selecting a first mode of interaction from among said at least two available modes, called an indirect handing mode in which the digital rendering device interprets the gesture performed as a command;
      when said number is smaller than or equal to a second predetermined value, selecting a second mode of interaction from among said at least two available modes, called a direct handling mode in which the digital rendering device interprets the gesture performed by the user as an interaction with elements displayed by the digital rendering device; and
   operating the digital rendering device in the selected first or second mode in response to the gesture, said operating comprising, in said indirect handing mode, the following acts:
      recognizing a shape drawn by said limbs or parts of limbs used to carry out said gesture;
      displaying a piece of data representing the recognized shape in an area at an end of the shape drawn by the user, called a piece of visual feedback data, said visual feedback data comprising at least a text caption;
      initializing a validation time counter for a predetermined period of time;
      validating the recognized shape when no action takes place during the period of time defined by said counter, said validating comprising performing a command associated with said recognized shape;
      when an action takes place during the period of time defined by said counter, initiating a corrective mechanism comprising:
         initializing the corrective mechanism;
         displaying a list of possible gestures;
         selecting, by the user, a gesture in the list of gestures;
         displaying actions to be performed by the recognition engine;
         selecting, by the user, said action to perform among said displayed actions to be performed by the recognition engine;
         performing said selected action to perform by the recognition engine.

2. The method for selecting according to claim 1, wherein said rendering device comprises a tactile surface and said at least one limb is a hand and said at least one part of a limb is a finger.

3. The method for selecting according to claim 1, wherein said rendering device comprises a stereoscopic camera and said at least one limb is an arm and said at least one part of a limb is a hand.

4. The method for selecting according to claim 1, wherein said first predetermined value is equal to said second predetermined value and said first predetermined value is equal to one.

5. A non-transitory computer-readable support comprising a computer program product stored thereon, which comprises program code instructions for executing a method of selecting a mode of interaction between a user and a digital rendering device from among at least two available modes, when the instructions are executed by a processor of the digital rendering device, said method comprising:
  selecting the mode of interaction between the user and the digital rendering device from among at least two available modes, wherein selecting comprises the following acts performed by the digital rendering device:
    obtaining, by a gesture capturing interface of said digital rendering device, at least one piece of information representing a gesture performed by the user, said gesture being performed by said user by using at least one limb or at least one part of a limb;
  counting from the obtained information a number of limbs or parts of limbs used to carry out said gesture;
  selecting a mode of interaction of the digital rendering device from among said at least two available modes as a function of the number, wherein selecting comprises:
    when said number exceeds a first predetermined value, selecting a first mode of interaction from among said at least two available modes, called an indirect handing mode in which the digital rendering device interprets the gesture performed by the user as a command;
    when said number is smaller than or equal to a second predetermined value, selecting a second mode of interaction from among said at least two available modes, called a direct handling mode in which the digital rendering device interprets the gesture performed by the user as an interaction with elements displayed by the digital rendering device; and
  operating the digital rendering device in the selected mode in response to the gesture, said operating comprising, in said indirect handing mode, the following acts:
    recognizing a shape drawn by said limbs or parts of limbs used to carry out said gesture;
    displaying of a piece of data representing the recognized shape in an area at an end of the shape drawn by the user, called a piece of visual feedback data, said visual feedback data comprising at least a text caption;
    initializing of a validation time counter for a predetermined period of time;
    validating the recognized shape when no action takes place during the period of time defined by said counter, said validating comprising performing a command associated with said recognized shape;
    when an action takes place during the period of time defined by said counter, initiating a corrective mechanism comprising:
      initializing the corrective mechanism;
      displaying a list of possible gestures;
      selecting, by the user, a gesture in the list of gestures;
      displaying actions to be performed by the recognition engine;
      selecting, by the user, said action to perform among said displayed actions to be performed by the recognition engine;
      performing said selected action to perform by the recognition engine.

6. The non-transitory computer-readable support according to claim 5, wherein the text caption is associated with the recognized shape.

7. The method for selecting according to claim 1, wherein the text caption is associated with the recognized shape.

* * * * *